United States Patent
Winiger et al.

(10) Patent No.: US 7,386,877 B2
(45) Date of Patent: Jun. 10, 2008

(54) SPECIFYING A REPOSITORY FOR AN AUTHENTICATION TOKEN IN A DISTRIBUTED COMPUTING SYSTEM

(75) Inventors: Gary W. Winiger, Mountain View, CA (US); Darren J. Moffat, Campbell, CA (US); Joep J. Vesseur, Amsterdam (NL)

(73) Assignee: Sun Microsystems, Inc., Santa Clara, CA (US)

( * ) Notice: Subject to any disclaimer, the term of this patent is extended or adjusted under 35 U.S.C. 154(b) by 1029 days.

(21) Appl. No.: 10/194,910

(22) Filed: Jul. 12, 2002

(65) Prior Publication Data

US 2004/0010715 A1   Jan. 15, 2004

(51) Int. Cl.
*G06F 17/30* (2006.01)
*G06F 15/16* (2006.01)
*H04L 9/00* (2006.01)

(52) U.S. Cl. .................... 726/3; 726/27; 713/183; 709/229

(58) Field of Classification Search .............. 726/3, 726/4, 5, 27
See application file for complete search history.

(56) References Cited

U.S. PATENT DOCUMENTS

| 5,774,551 | A | * | 6/1998 | Wu et al. .................. 713/155 |
| 5,918,228 | A | * | 6/1999 | Rich et al. .................. 707/10 |
| 6,182,142 | B1 | * | 1/2001 | Win et al. .................. 709/229 |
| 6,341,352 | B1 | * | 1/2002 | Child et al. .................. 726/1 |
| 6,813,641 | B2 | * | 11/2004 | Fomenko et al. ......... 709/230 |
| 6,950,943 | B1 | * | 9/2005 | Bacha et al. .............. 713/164 |
| 6,976,164 | B1 | * | 12/2005 | King et al. ................ 713/156 |
| 6,996,832 | B2 | * | 2/2006 | Gunduc et al. ........... 719/331 |
| 2002/0095571 | A1 | * | 7/2002 | Bradee .................... 713/164 |
| 2003/0110312 | A1 | * | 6/2003 | Gunduc et al. ........... 709/328 |
| 2003/0204724 | A1 | * | 10/2003 | Ayyagari et al. ......... 713/168 |
| 2005/0005173 | A1 | * | 1/2005 | Moffat et al. ............. 713/202 |

* cited by examiner

*Primary Examiner*—Ayaz Sheikh
*Assistant Examiner*—Kaveh Abrishamkar
(74) *Attorney, Agent, or Firm*—Park, Vaughan & Fleming LLP; Edward J. Grundler

(57) ABSTRACT

One embodiment of the present invention provides a system that facilitates specifying a repository containing authentication information to a plugin in a plugable authentication system. When the system receives a command that requires the repository to be accessed, the system populates a data structure with information including a specifier for the repository. The system passes this data structure into a plugin framework. This enables one or more plugins within the framework to access the specified repository.

18 Claims, 4 Drawing Sheets

SPECIFYING A REPOSITORY FOR AN AUTHENTICATION TOKEN IN A DISTRIBUTED COMPUTING SYSTEM

BACKGROUND

1. Field of the Invention

The present invention relates to the process of authenticating users within a computer system. More specifically, the present invention relates to a method and an apparatus for specifying a repository containing an authentication token to various plugins within a plugin framework.

2. Related Art

Distributed computing systems typically require a user to be authenticated prior to allowing the user to access services provided by the distributed computing system. This authentication process typically involves matching authentication information provided by the user with an authentication token stored within the distributed computing system. Distributed systems often use authentication tokens that specify a "user name" and a "password." During operation of this type of system, a user is prompted to provide a user name and a password. The user name and password provided by the user are compared against user names and passwords stored within the system. If a match is found, the user is authenticated. Note that in general many other types of authentication tokens can be used (such as biometric information in the form of a fingerprint).

Distributed systems can potentially store authentication tokens in many different repositories. For example, authentication tokens can be stored in a local file system of the user's computer, in a network information service (NIS) database, in a NIS+ database, or in a lightweight directory access protocol (LDAP) database. Many other possible repositories can be used, as long as access control mechanisms within the distributed computing system are able to access the tokens. The system typically accesses these tokens to provide authentication, credential establishment, session establishment, session teardown, and password change operations.

Some computer systems make use of a plugin framework to access system plugins. At least one existing plugin framework facilitates passing authentication information into plugins that enable the plugins that perform authentication operations.

Unfortunately, these existing plugin frameworks have shortcomings. After accessing a given computer system within a distributed computing system, a user may want to access a different computer system, possibly in a different domain associated with a different repository containing different authentication information. Existing plugable frameworks do not allow different repositories for authentication information to be specified. Consequently, system programmers have developed solutions that bypass the plugin framework when a different repository is specified. Note that bypassing the plugable authentication system in this way largely defeats the purpose of the plugable authentication system.

What is needed is a method and an apparatus for specifying a repository for authentication information within a plugin framework without the problems described above.

SUMMARY

One embodiment of the present invention provides a system that facilitates specifying a repository containing authentication information to a plugin in a plugable authentication system. When the system receives a command that requires the repository to be accessed, the system populates a data structure with information including a specifier for the repository. The system passes this data structure into a plugin framework. This enables one or more plugins within the framework to access the specified repository.

In one embodiment of the present invention, the command includes a change authentication token command to change an authentication token within the repository.

In one embodiment of the present invention, the authentication token includes a password.

In one embodiment of the present invention, accessing at least one plugin involves accessing a series of plugins in a pre-specified order.

In one embodiment of the present invention, the system authenticates the user who originated the command prior to passing the data structure to the plugin framework.

In one embodiment of the present invention, if there is no data within the command, the system populates the data structure with null values.

In one embodiment of the present invention the specifier contains type information, which specifies a type for the repository.

In one embodiment of the present invention, the system examines the type field of the data structure at the plugin to determine the type of the repository. If the type field contains a null value, the system processes the command in the default manner specified for the plugin. If the type field contains a type value known to the plugin, the system processes the command using an optional scope included in the data structure. If the type field contains a type value unknown to the plugin, the system ignores the command.

Table 1 illustrates a data structure for specifying a repository in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system.

This includes, but is not limited to, magnetic and optical storage devices such as disk drives, magnetic tape, CDs (compact discs) and DVDs (digital versatile discs or digital video discs).

Computer System

Figure 1:
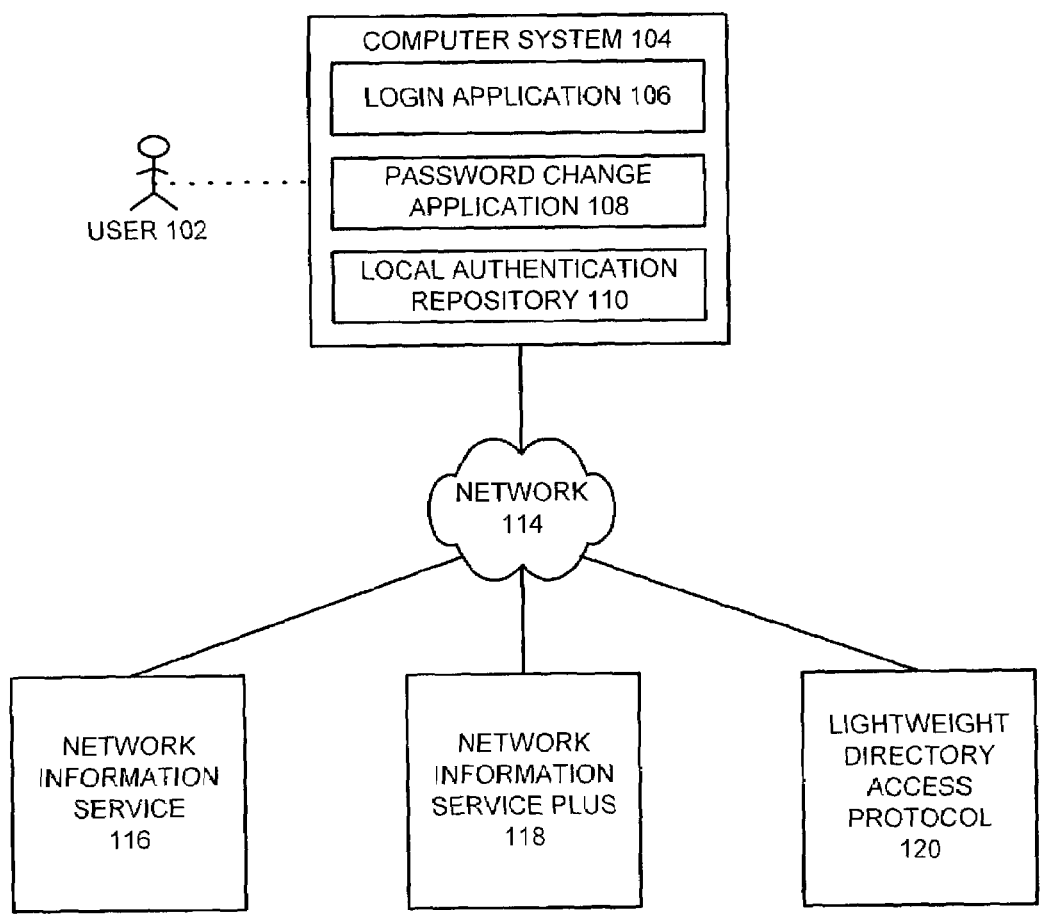
FIG. 1 illustrates a computer system coupled to multiple authentication repositories in accordance with an embodiment of the present invention.

FIG. 1 illustrates a computer system 104 coupled to multiple authentication repositories in accordance with an embodiment of the present invention. Computer system 104 is coupled to a distributed authentication repository comprised of local authentication repository 110, network information service (NIS) 116, NIS+ 118, and lightweight directory access protocol (LDAP) 120. Computer system 104 can generally include any type of computer system, including, but not limited to, a computer system based on a microprocessor, a mainframe computer, a digital signal processor, a portable computing device, a personal organizer, a device controller, and a computational engine within an appliance.

NIS 116 is a distributed network database containing key information about the systems and the users on the network. The NIS 116 database is stored on the master server and all the slave servers. NIS+ 118 is an enhanced version of NIS 116. LDAP 120 is a protocol for accessing online directory services. LDAP 120 runs directly over TCP, and can be used to access a standalone LDAP directory service or to access a directory service that is back-ended by X.500.

Computer system 104 is coupled to NIS 116, NIS+ 118, and LDAP 120 by network 114. Network 114 can generally include any type of wire or wireless communication channel capable of coupling together computing nodes. This includes, but is not limited to, a local area network, a wide area network, or a combination of networks. In one embodiment of the present invention, network 114 includes the Internet.

Computer system 104 includes login application 106, password application 108, and local authentication repository 110. Login application 106 authenticates user 102 to the system, which enables user 102 to access the system. Password application 108 facilitates changing passwords as described below in conjunction with FIG. 2. Local authentication repository 110 is a portion of the distributed authentication repository.

Accessing the Distributed Authentication Repository

Figure 2:
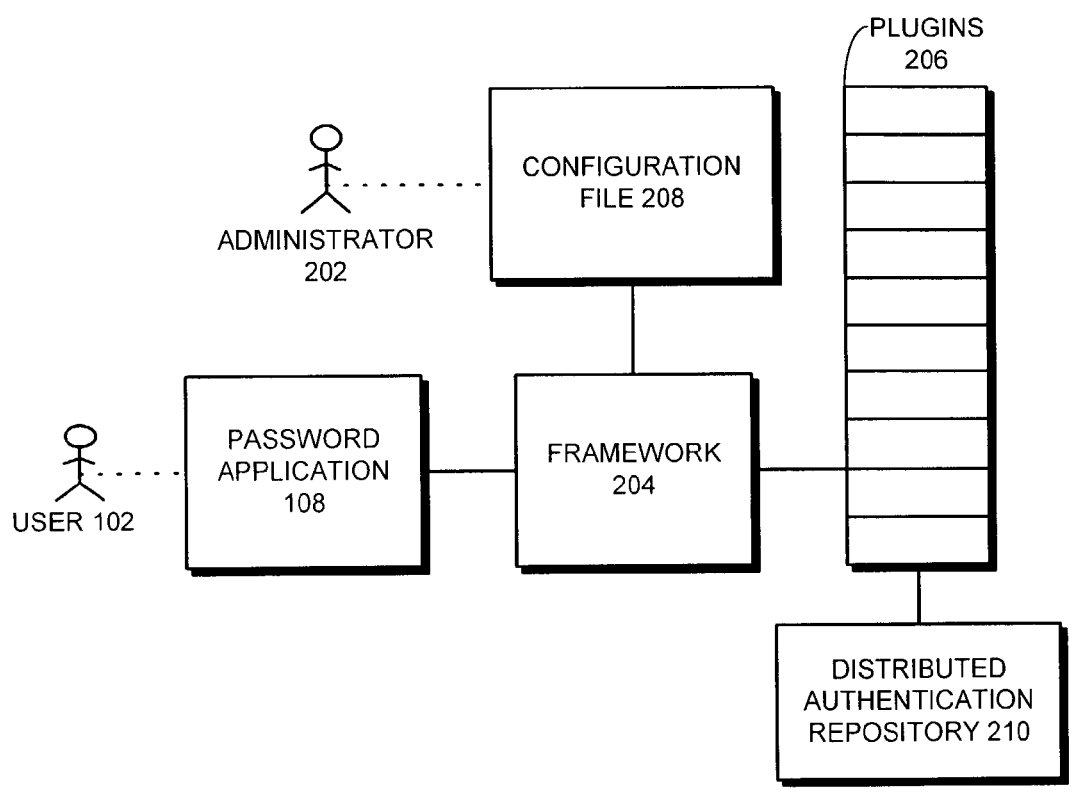
FIG. 2 illustrates a plugin framework in accordance with an embodiment of the present invention.

FIG. 2 illustrates a plugin framework in accordance with an embodiment of the present invention. User 102 accesses password application 108 to change a password within distributed authentication repository 210. Note that distributed authentication repository 210 can include the components described above and/or any other components that can fulfill the requirements of an authentication repository.

Administrator 202 provides configuration file 208, which specifies the behavior of the system by specifying an order for applying plugins by framework 204. Framework 204 routes commands from password application 108 to various plugins within plugins 206 in the order specified by configuration file 208. Plugins 206 process these commands and update distributed authentication repository 210 using the information supplied within the command.

During operation, user 102 provides a command, such as "passwd" to change a password within the distributed authentication repository 210. This command, along with a data structure containing information related to the command, is passed to framework 204 for execution. The data structure related to the command provides information concerning the repository type and scope of the command. One possible implementation of this data structure is:

TABLE 1

```
typedef struct pam_repository {
    char      *type;       /* repository type       */
    void      *scope;      /* optional scope info   */
    size_t    scope_len;   /* length of info        */
} pam_repository_t;
```

This data structure is populated by password application 108 using optional information provided by the passwd command.

For example, if user 102 wants to change the default password on the system, user 102 can type: "passwd". In response, the system will prompt the user for the old password, the new password, and a verification copy of the new password. Since no optional information is passed to password application 108, the data structure is populated with null values.

Framework 204 selects plugins from plugins 206 in the order specified by configuration file 208. Each plugin, in turn, examines the type field of the repository. Since the type field is null, each plugin performs a default action that is specified within the plugin.

User 102 can specify a repository type with the passwd command. For example, the user can type: passwd-r NIS. In this case, password application 108 populates the type field within the data structure with "NIS" and sets the scope_len field to zero since no scope was supplied with the command. Each plugin called by framework 204 examines the type field, finds the type is NIS, and performs the action specified within the plugin for a NIS repository, including locating the NIS repository within the current domain. If the plugin does not have an action related to the type, the command is ignored.

If user 102 wishes to change a password in a different domain, for example, changing a password in the domain "foobar.coy.com," the domain name can be entered along with the repository type through the command: passwd-r NIS+-Dfoobar.coy.com. In response to this command, password application 108 populates the data structure type field with "NIS+", the scope field with "foobar.coy.com" and the scope_len field with "14" indicating the length of the scope field. Each plugin uses the scope field to direct the command to the specified repository within the specified scope. As above, if the plugin does not have an action related to the type, the command is ignored.

Accessing a Distributed Authentication Repository

Figure 3:
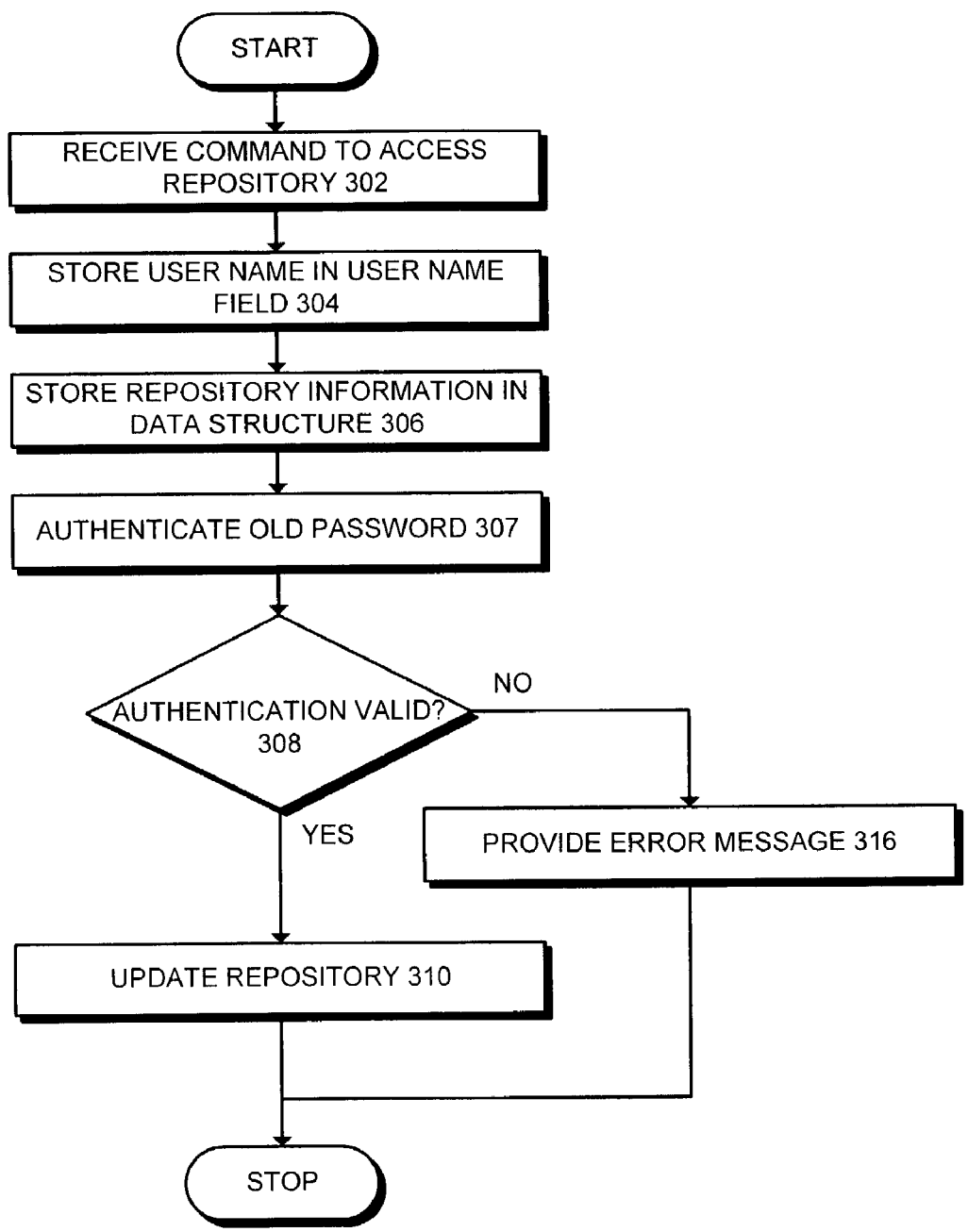
FIG. 3 is a flowchart illustrating the process of accessing a distributed authentication repository in accordance with an embodiment of the present invention.

FIG. 3 is a flowchart illustrating the process of accessing a distributed authentication repository in accordance with an embodiment of the present invention. The system starts when password application 108 receives a command from user 102 to access the distributed authentication repository to change a password (step 302). Next, password application 108 stores the user name in a user name field to send to framework 204 (step 304). Password application 108 then populates the data structure with optional information from the command entered by user 102 (step 306). Note that if there is no optional information for the fields within the data structure, password application 108 sets these fields to null.

Next, password application 108 authenticates information supplied by the user, which in this case can involve authenticating an old password (step 307). Password application 108 then determines if user 102 has entered valid authentication information (step 308). If not, password application 108 provides an error message (step 316) and terminates the process. If user 102 has entered valid authentication information, the system updates the repository with the new password (step 310).

Note that the process of determining if the user has entered valid authentication information in step 307 and the process of updating the repository with the new password in step 310 both involve accessing the repository and traversing the stack of plugins. This process is described in more detail below with reference to FIG. 4.

Plugin Executing a Command

Figure 4:
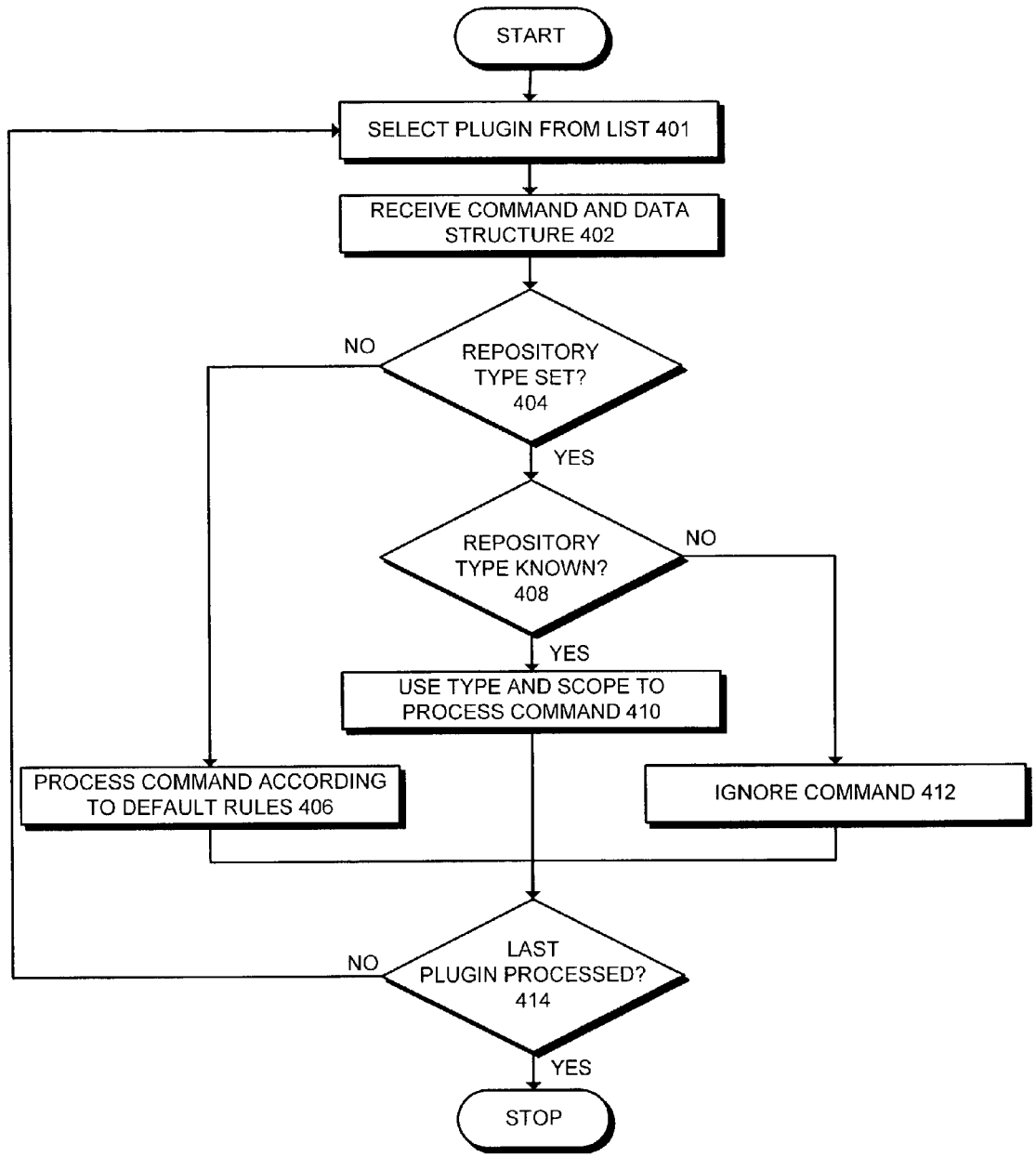
FIG. 4 is a flowchart illustrating how a plugin executes a command in accordance with an embodiment of the present invention.

FIG. 4 is a flowchart illustrating how a plugin executes a command in accordance with an embodiment of the present invention. Framework 204 initially selects a plugin from plugins 206 in accordance with the precedence set by administrator 202 in configuration file 208 (step 401). The system also receives a command, including a data structure associated with the command, from password application 108 (step 402). Next, the plugin determines if the repository type is set within the data structure (step 404). If not, the plugin processes the command according to default rules specified within the plugin and terminates the process (step 406).

If the repository type is set at step 404, the plugin determines if the repository type is known (step 408). If so, the plugin uses the type and the optional scope to process the command and terminates the process (step 410). Note that if the scope is set, the command may be directed to a different domain. If the repository type is not known to the plugin, the plugin ignores the command and terminates the process (step 412). Framework 204 then determines if the last plugin has been processed (step 414). If not, the process returns to step 401 to select the next plugin identified in configuration file 208, otherwise the process is terminated.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method to facilitate specifying a repository containing authentication information within a pluggable authentication system, wherein the repository is part of a distributed computer system, comprising:
    receiving a command that includes a specifier for the repository and requires the repository to be accessed, wherein the specifier indicates where the repository is located within the distributed computer system;
    populating a data structure with optional data from the command, wherein the data structure includes the specifier for the repository;
    if there is no optional data within the command, populating the data structure with null values, whereby plugins can recognize the default values and can perform a default action when no optional data is supplied within the command; and
    passing the data structure to a plugin framework, thereby enabling one or more plugins within the framework to:
    locate the specified repository, and to
    access the specified repository;
    wherein accessing at least one plugin involves accessing a series of plugins in an order specified by a security administrator.

2. The method of claim 1, wherein the command includes a change authentication token command to change an authentication token within the repository.

3. The method of claim 2, wherein the authentication token includes a password.

4. The method of claim 1, further comprising authenticating a user that originated the command prior to passing the data structure to the plugin framework.

5. The method of claim 1, wherein the specifier contains type information, which specifies a type for the repository.

6. The method of claim 1, further comprising:
    examining a type field within the data structure at the type of the repository; and
    if the type field contains a null value,
        processing the command in a default manner specified within the plugin,
    else if the type field contains a type value known to the plugin,
        processing the command using an optional scope included in the data structure,
    otherwise,
        ignoring the command.

7. A computer-readable storage medium storing instructions that when executed by a computer cause the computer to perform a method to facilitate specifying a repository containing authentication information within a pluggable authentication system, wherein the repository is part of a distributed computer system, the method comprising:
    receiving a command that includes a specifier for the repository and requires the repository to be accessed, wherein the specifier indicates where the repository is located within the distributed computer system;
    populating a data structure with optional data from the command, wherein the data structure includes the specifier for the repository;
    if there is no optional data within the command, populating the data structure with null values, whereby plugins can recognize the default values and can perform a default action when no optional data is supplied within the command; and
    passing the data structure to a plugin framework, thereby enabling one or more plugins within the framework to:
    locate the specified repository, and to
    access the specified repository;
    wherein accessing at least one plugin involves accessing a series of plugins in an order specified by a security administrator.

8. The computer-readable storage medium of claim 7, wherein the command includes a change authentication token command to change an authentication token within the repository.

9. The computer-readable storage medium of claim 8, wherein the authentication token includes a password.

10. The computer-readable storage medium of claim 7, the method further comprising authenticating a user that originated the command prior to passing the data structure to the plugin framework.

11. The computer-readable storage medium of claim 7, wherein the specifier contains type information, which specifies a type for the repository.

12. The computer-readable storage medium of claim 7, the method further comprising:
    examining a type field within the data structure at the type of the repository; and if the type field contains a null value,
  processing the command in a default manner specified within the plugin,
else if the type field contains a type value known to the plugin,
  processing the command using an optional scope included in the data structure,
otherwise,
  ignoring the command.

13. An apparatus to facilitate specifying a repository containing authentication information within a pluggable authentication system, wherein the repository is part of a distributed computer system, comprising:
  a receiving mechanism that is configured to receive a command that includes a specifier for the repository and requires the repository to be accessed, wherein the specifier indicates where the repository is located within the distributed computer system;
  a populating mechanism that is configured to populate a data structure with optional data from the command, wherein the data structure includes the specifier for the repository;
  a setting mechanism that is configured to populate the data structure with null values if there is no optional data within the command, whereby plugins can recognize the default values and can perform a default action when no optional data is supplied within the command; and
  a data structure passing mechanism that is configured to pass the data structure to a plugin framework, thereby enabling one or more plugins within the framework to:
  locate the specified repository, and to
  access the specified repository;
  wherein accessing at least one plugin involves accessing a series of plugins in an order specified by a security administrator.

14. The apparatus of claim 13, wherein the command includes a change authentication token command to change an authentication token within the repository.

15. The apparatus of claim 14, wherein the authentication token includes a password.

16. The apparatus of claim 13, further comprising an authenticating mechanism that is configured to authenticate a user that originated the command prior to passing the data structure to the plugin framework.

17. The apparatus of claim 13, wherein the specifier contains type information, which specifies a type for the repository.

18. The apparatus of claim 13, further comprising:
  an examining mechanism that is configured to examine a type field within the data structure at the type of the repository; and
  a processing mechanism that is configured to process the command in a default manner specified within the plugin, if the type field contains a null value;
  wherein the processing mechanism is further configured to process the command using an optional scope included in the data structure if the type field contains a known type value; and
  wherein the processing mechanism is further configured to ignore the command if the type field contains an unknown type value.

* * * * *